W. I. DRUMMOND.
HARROW.
APPLICATION FILED NOV. 2, 1914.
1,165,857.
Patented Dec. 28, 1915.
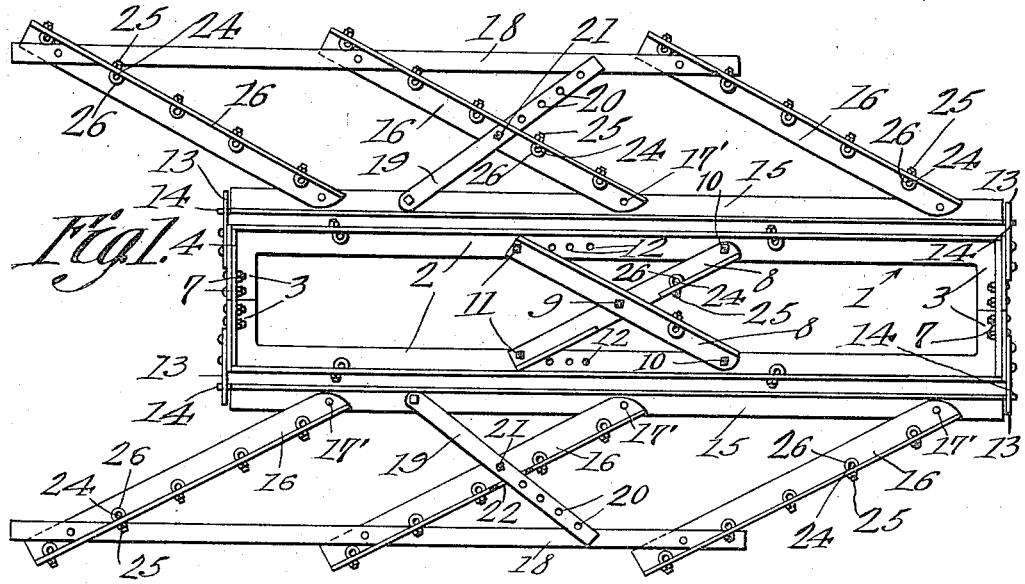
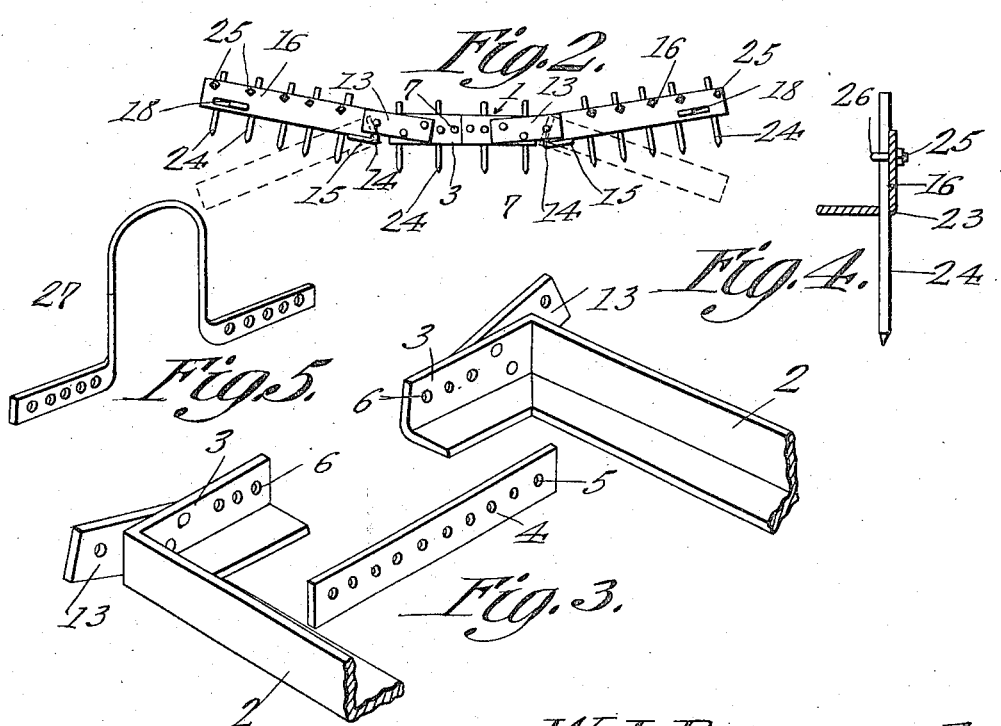
W. I. Drummond,
Inventor
Witnesses
by
Attorneys

UNITED STATES PATENT OFFICE.

WILBERT I. DRUMMOND, OF MUSKOGEE, OKLAHOMA.

HARROW.

1,165,857.  Specification of Letters Patent.  Patented Dec. 28, 1915.

Application filed November 2, 1914. Serial No. 869,865.

*To all whom it may concern:*

Be it known that I, WILBERT I. DRUMMOND, a citizen of the United States, residing at Muskogee, in the county of Muskogee and State of Oklahoma, have invented a new and useful Harrow, of which the following is a specification.

This invention relates to harrows especially designed for use in dry farming.

One of the objects of the invention is to provide a harrow having a central structure adjustable to different widths and to the sides of which are connected adjustable wings adapted to swing upwardly and downwardly relative to the central structure, the construction of the harrow being such that the same can be used for the purpose of pulverizing the surface ground and creating a dust mulch between rows of growing crops such as corn, without disturbing the contour of the ground as left by the cultivator and without cutting too deeply into the ground close to the plants, which often results in breaking the top root.

A further object is to provide a harrow which will produce a shallow mulch of uniform depth irrespective of the contour of the ground between two rows.

A further object is to provide a harrow which can be adjusted readily to rows of different widths and which can be used not only in creating a dust mulch between rows, but can also be used to form a dust mulch on listed land when the center structure is adjustable to fit a ridge of any width, the side wings being readily adjustable to conform to the side surfaces of the ridge.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred forms of the invention have been shown.

In said drawings:—Figure 1 is a plan view of the harrow. Fig. 2 is an end elevation thereof, the wings being shown in full lines disposed in upwardly diverging planes, as when supported upon the inclined sides of a ditch or furrow and being shown, in dotted lines, disposed along downwardly diverging planes as when supported by the sides of a ridge straddled by the harrow. Fig. 3 is a perspective view of one end portion of the middle structure of the harrow, the parts being separated. Fig. 4 is an enlarged section through one of the members of the harrow and showing a tooth secured thereto. Fig. 5 is a perspective view of a modified form of connecting strip to be used when the harrow is to straddle a row.

Referring to the figures by characters of reference 1 designates a central frame made up of side strips 2, each side strip being provided at its ends with inwardly extending arms 3, both the strips and their arms being made of angle iron in the preferred embodiment of the invention. The two side strips are oppositely disposed and the arms thereof are adapted to be connected by end strips 4 each of which has a longitudinal series of apertures 5. Apertures 6 are formed within the arms 3 and the strips 4 are adapted to be secured to the arms and, by placing the bolts 7 in different openings, the said arms 3 can be held at different distances apart so that it is thus possible to adjust the frame 1 to different widths. At an intermediate point the side strips 2 of the frame can be connected by cross strips 8 pivotally connected at their centers as shown at 9. These strips are also pivotally connected at one end to the strips 2, as shown at 10, while the other ends are adjustably connected to the strips 2 by means of bolts 11, each bolt being adapted to be placed in any one of a series of apertures 12 formed within the strip 2.

Extending laterally from the end portions of the strips 2 are brackets 13 and journaled within the brackets on each strip 2 are trunnions 14 extending from the ends of an angle strip 15. This angle strip constitutes the inner side of a wing and has laterally extending angularly adjustable angle strips 16 connected to it by means of bolts 17'. Strips 16 are pivotally connected at their outer ends to a connecting strip 18 and in order that the various angle strips 16 may be held against movement relative to the inner side strip 15, a brace strip 19 is pivotally connected to the inner side strip 15 and has a series of apertures 20, any one of which is adapted to receive a bolt 21 extending through the intermediate strip 16. The upstanding flange of the intermediate angle strip 16 which is engaged by the strip 19 is formed with a slot 22 so that said strip 19 can rest flat upon the strip 16.

From the foregoing, it will be apparent that the harrow structure is made up of the central frame 1 which is adjustable in width, and of the side wings made up of the strips 15, 16, 18 and 19 which side wings are adapted to swing about their connections with the brackets 13. By detaching the strip 19 from the strips 16, the said strips 16 can be swung about their pivot bolts 17' so as to extend any desired distance laterally from the inner side strip 15 after which they can be held by re-securing the strip 19.

Each of the strips 16 and the cross strips 8 is provided in its bottom portion and close to its upstanding flange, with spaced openings 23 and extending through each of the openings is a harrow tooth 24. Each harrow tooth is clamped to the upstanding flange of the angle strip by a bolt 25 having a hooked portion 26 which straddles the tooth. Thus it will be seen that the teeth can be quickly placed in or removed from position and they can also be adjusted longitudinally relative to the angle strip carrying the same.

When it is desired to loosen the surface of the soil between two rows so as to form a shallow dust mulch of uniform depth, the frame 1 is adjusted to the width of the bottom of the furrow or distance between the rows and the side wings of the harrow are then adjusted to the width of the sides of the adjacent ridges. Thus as the harrow conforms to the contour of the surface between the two rows, it will loosen the surface soil to a uniform depth without digging into the roots of the plants and injuring the plants as is the case where a rigid harrow is drawn between two rows. Furthermore, where it is desired to produce a dust mulch upon a ridge, it is merely necessary to adjust the frame 1 to the width of the top of the ridge and to then adjust the side wings of the harrow so that the said wings will travel along the side faces of the ridge throughout the width thereof.

Should it be desired to use the harrow as a straddle row implement, a connecting strip such as shown in Fig. 5 can be substituted for the strips 4, this connecting strip having an intermediate arched portion 27 designed to pass over the plants without injuring them.

Various changes can of course be made in the construction of the device without departing from the spirit of the invention. For example, if desired, weed removing knives can be attached to any desired part of the harrow, or teeth other than those illustrated and described can be used.

What is claimed is:—

1. A flexible harrow including a central tooth carrying frame adjustable to different widths, and a wing hingedly connected to each side portion of the frame.

2. A flexible harrow including a central tooth carrying frame adjustable to different widths, and a wing hingedly connected to each side portion of the frame, each wing being adjustable to different widths.

3. A harrow including a central tooth carrying frame made up of opposed side portions and adjustable connections between said side portions, and a wing hingedly connected to each side of the frame, each wing including an inner side strip, laterally extending strips pivotally connected thereto, a connection between said laterally extending strips, and means for holding the various strips fixed relative to each other.

4. A harrow including a central frame made up of opposed side strips, adjustable connections between the side strips, crossed connections between said strips and constituting tooth carrying means, and a wing hingedly connected to each side of the frame, each wing including angularly adjustable members and means for holding said members against adjustment, each of said members constituting a tooth carrying portion.

5. A harrow including a central frame adjustable to different widths and including side strips having inwardly extending arms, an adjustable connection between the arms, means within the sides of the frame for supporting harrow teeth, and a wing hingedly connected to each side of the frame, each wing including an inner side strip, laterally extending tooth carrying strips pivotally connected thereto, connections between the outer end portions of said laterally extending strips, and means for holding the strips against movement relative to each other.

6. In a harrow, the combination with a central tooth carrying frame adjustable to different widths and brackets extending laterally from the frame and crossed tooth carrying members adjustably and pivotally connected to the sides of the frame, of a wing at each side of the frame, each wing including an inner side strip, trunnions extending therefrom and journaled within the brackets, tooth carrying strips pivotally connected to the inner side strip, a connection between the outer end portions of said tooth carrying strips, and adjustable means for holding the tooth carrying strips against movement after adjustment to a predetermined angle relative to the inner side strip.

7. A harrow including a central frame adjustable to different widths, said frame comprising side strips, straight arms extending inwardly from the ends of the side strips, means for adjustably connecting said arms and holding them against relative movement, means upon the side strips for securing teeth thereto, and a wing hingedly connected to and parallel with each side strip, each wing including an inner side strip, laterally extending tooth carrying strips pivotally connected thereto, connections between the outer end portions of said laterally extending strips, means for holding the strips of the wing against movement relative to each other, and tooth engaging means carried by the strips of the wing.

8. A harrow including a central frame adjustable to different widths, said frame comprising side strips, straight arms extending inwardly from the ends of the side strips, means for adjustably connecting said arms and holding them against relative movement, means upon the side strips for securing teeth thereto, and a wing hingedly connected to and parallel with each side strip, each wing including an inner side strip, laterally extending tooth carrying strips pivotally connected thereto, connections between the outer end portions of said laterally extending strips, means for holding the strips of the wing against movement relative to each other, tooth engaging means carried by the strips of the wings, and crossed pivotally connected sections pivotally and adjustably secured to the side strips of the central frame, and means for securing teeth to said crossed strips.

In testimony that I claim the foregoing as my own, I have hereto affixed my signature in the presence of two witnesses.

WILBERT I. DRUMMOND.

Witnesses:
WALTER F. HEAD,
EARL W. SMITH.

Copies of this patent may be obtained for five cents each, by addressing the "Commissioner of Patents, Washington, D. C."